United States Patent [19]

Saito et al.

[11] Patent Number: 5,457,559
[45] Date of Patent: Oct. 10, 1995

[54] APPARATUS FOR EXTRACTING AN OPTICAL CLOCK AND APPARATUS FOR DEMULTIPLEXING A TIME-DIVISION MULTIPLEXED SIGNAL

[75] Inventors: Tomoki Saito; Naoya Henmi, both of Tokyo, Japan

[73] Assignee: NEC Corporation, Japan

[21] Appl. No.: 225,589

[22] Filed: Apr. 11, 1994

[30] Foreign Application Priority Data

Apr. 9, 1993 [JP] Japan .................................. 5-083179

[51] Int. Cl.$^6$ ..................................................... H04J 14/08
[52] U.S. Cl. ........................... 359/135; 359/187; 359/194
[58] Field of Search ..................................... 359/158, 140, 359/135, 138–139, 187, 194, 329; 375/106, 120

[56] References Cited

U.S. PATENT DOCUMENTS

| 4,980,891 | 12/1990 | Izadpanah | 359/138 |
|---|---|---|---|
| 5,339,185 | 8/1994 | Kaede | 359/158 |

OTHER PUBLICATIONS

Shuppan, Sanpo, *The Technology for PCM Communication*, (Aug., 1976), pp. 84–89, 106–109.

Kawanishi, S. and Saruwatari, M., *Electronics Letters*, "10GH$_z$ Timing Extraction From Randomly Modulated Optical Pulses Using Phase–Locked Loop with Travelling–Wave Laser–Diode Optical Amplifier Using Optical Gain Modulation", vol. 28. No. 5 (Feb. 27, 1992), pp. 510–511.

*Electronics Letters*, "16 Gbit/s All–Optical Demultiplexing Using Four–Wave Mixing", vol. 27, No. 11 (May 23, 1991), pp. 922–924.

*Electronics Letters*, "Demonstration of the Nonlinear Fibre Loop Mirror As an Ultrafast All–Optical Demultiplexer", vol. 26, No. 14 (Jul. 5, 1990), pp. 962–964.

Morioka, Toshio and Saruwatari, Masatoshi, *IEEE Journal on Selected Areas in Communications*, "Ultrafast All–Optical Switching Utilizing the Optical Kerr Effect in Polarization–Maintaining Single–Mode Fibers", vol. 6, No. 7 (Aug., 1988), pp. 1186–1198.

*Electronics Letters*, "Demonstration of the Optical Kerr Effect in an All–Fibre Mach–Zehnder Interferometer at Laser Diode Powers", vol. 24, No. 6 (Mar. 17, 1988), pp. 340–341.

Primary Examiner—Leo H. Boudreau
Assistant Examiner—Kinfe-Michael Negash
Attorney, Agent, or Firm—Ostrolenk, Faber, Gerb & Soffen

[57] ABSTRACT

A signal light and a clock light which is generated by a clock light generator are propagated through a non-linear optical medium of, for instance, a silica based single mode optical fiber, from which the signal and clock lights and a four-wave mixing light are obtained. One light, for instance, the four-wave mixing light is extracted from the output lights of the non-linear optical medium, and a control signal which is dependent on a time-mean value in power of the extracted light is applied to a voltage controlled oscillator (VCO) for driving the clock light generator. Thus, a clock light which is locked in phase to the signal light is obtained. In case where the signal light comprises N time-division sequential lights (N=1, 2, 3, - - -), and a clock frequency of the clock light is 1/N of a clock frequency of the signal light, each one of the N time-division seaquential lights is shifted in phase or frequency by the non-linear optical medium, so that the phase or frequency shifted sequential light is switched to be demultiplexed by a switch device such as an optical coupler and a polarization beam splitter.

8 Claims, 13 Drawing Sheets

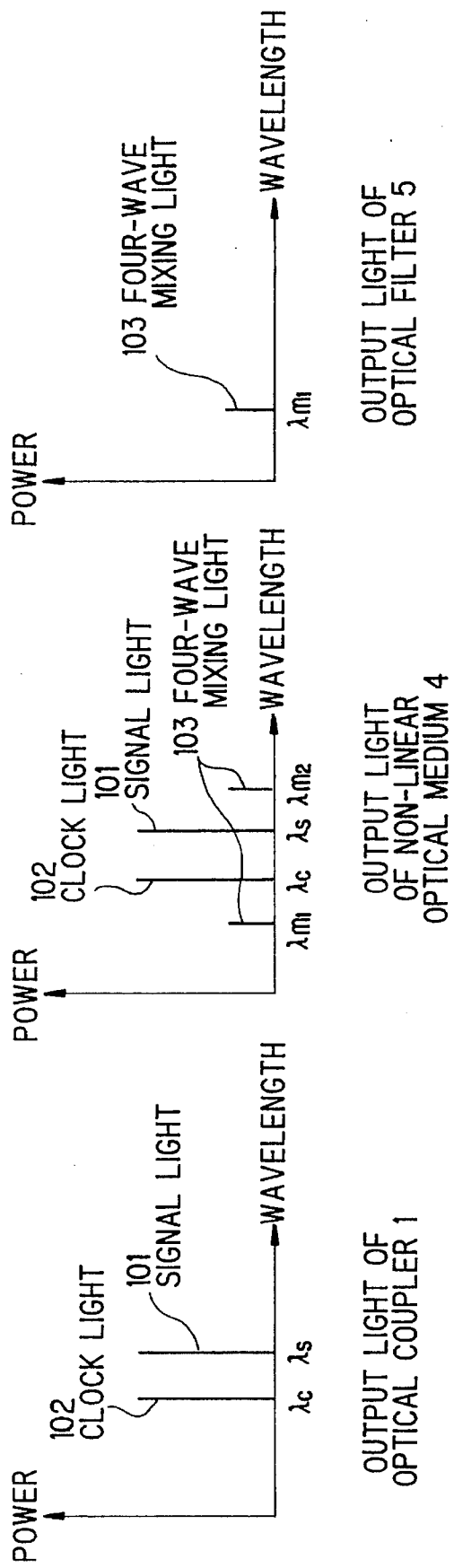

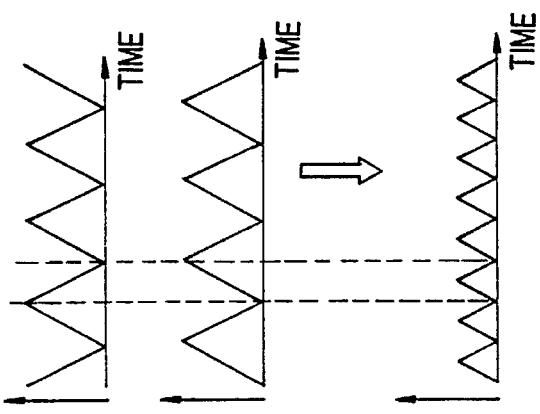
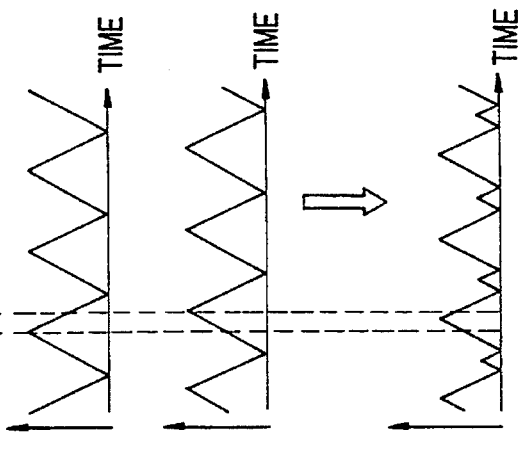
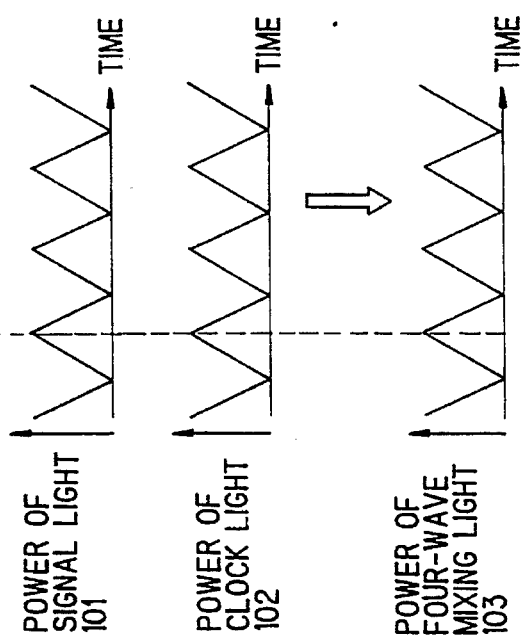
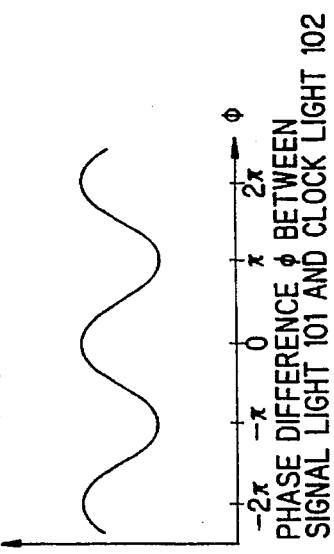

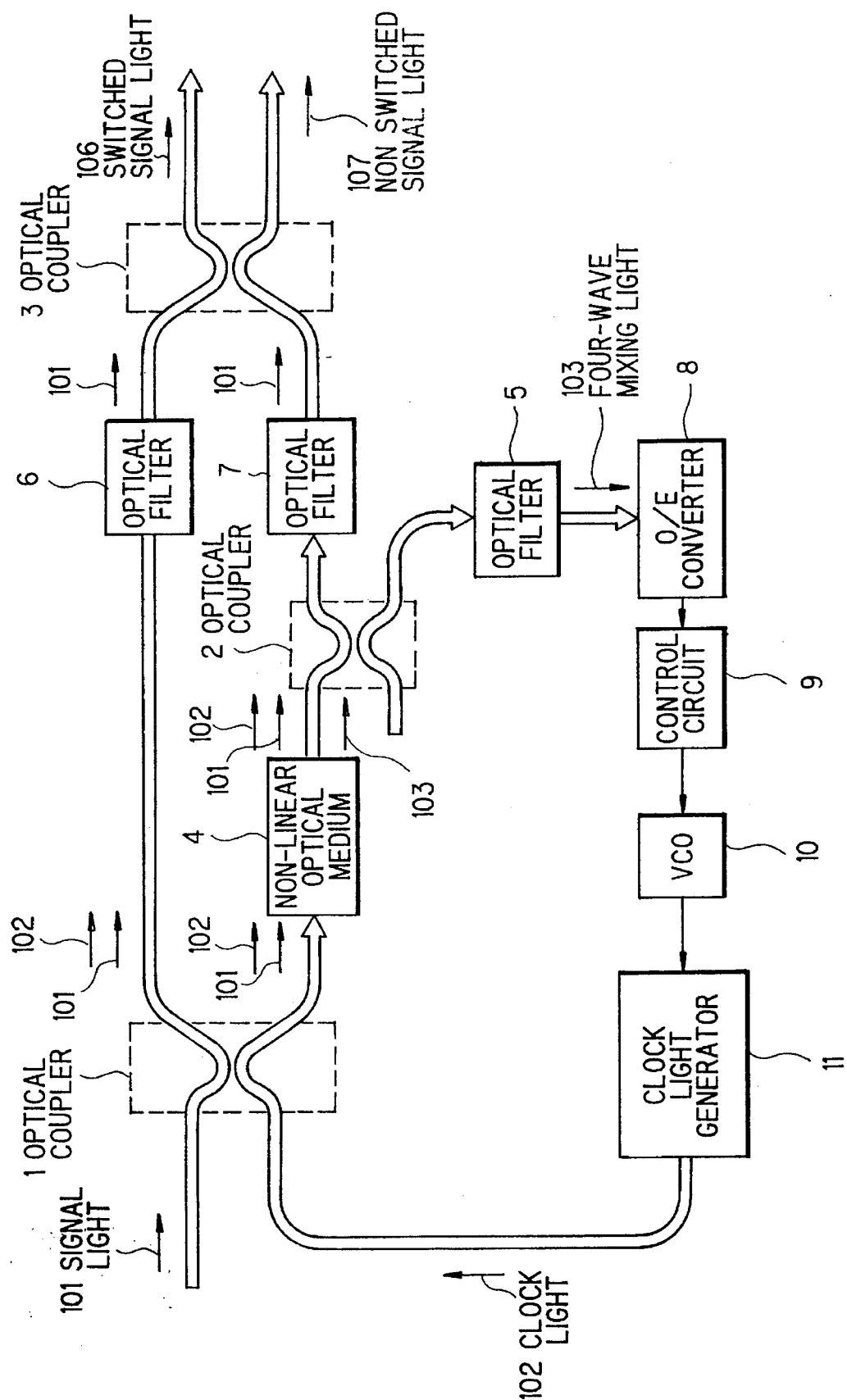

APPARATUS FOR EXTRACTING AN OPTICAL CLOCK AND APPARATUS FOR DEMULTIPLEXING A TIME-DIVISION MULTIPLEXED SIGNAL

FIELD OF THE INVENTION

This invention relates to an apparatus for extracting an optical clock and an apparatus for demultiplexing a time-division multiplexed signal, and more particularly, to the timing extraction and the demultiplexing of a signal light carried out by the four-wave mixing light generated by the signal light and a clock light.

BACKGROUND OF THE INVENTION

The clock extraction is used to provide a central timing point of eye for the purpose of setting up synchronism between a transmitter and a receiver, and correctly discriminating equalized signals.

In a conventional optical communication system, a clock is obtained in accordance with an electric signal converted from a light signal by using an optical to electric (O/E) converter, for instance, as described below.

On pages 85 and 86 of "the technology for PCM communication" published in August of 1976 by Sanpo Shuppan, a self-timing extraction method is described. In this method, an electric signal is obtained from a signal light coded in NRZ coding to be propagated via a transmission line by using an O/E converter and a clock component of the electric signal is emphasized by a differential turn-back circuit, so that an unnecessary frequency component is removed to provide a clock signal by using a band-pass filter having a high Q value.

On pages 106 to 109 of the above described literature, a method using a phase locked oscillator is described. In this method, a phase locked loop (PLL) comprising a phase detection circuit, a low band-pass filter, and a voltage controlled oscillator (VCO) is used, wherein the phase detection is carried out in the phase detection circuit between an input signal and an output signal of the VCO, and an output signal of the phase detection circuit is supplied to the low band-pass filter to be fed back to the VCO, so that a clock signal which is synchronous with the input signal is obtained.

On pages 510 to 551 of "Electronics Letters, Vol. 28, No. 5, February, 1992", an optical signal processing system in which high speed signal processing is carried out to cope with recently developed high speed optical communication with a data rate greater than 10 Gb/s is described. This system comprises a PLL circuit utilizing an optical correlative detection in a semiconductor optical amplifier. In this system, a pulse coded signal light of a clock frequency f and a clock light of a repetition frequency (f+$\Delta$f) which is an output light of a clock light generator driven by a clock obtained from an oscillation frequency f of a VCO which is superposed with a frequency $\Delta$f are supplied to the optical amplifier, in which a gain of the signal light is modulated in accordance with gain saturation by the clock light, so that a component of the frequency $\Delta$f which is a correlation between the signal and clock lights is generated in an output signal light of the optical amplifier. Consequently, a clock light which is locked in phase to the signal light is obtained by detecting a phase fluctuation of the $\Delta$f component, and feeding the detected phase fluctuation back to the VCO.

On the other hand, the processing of electric signals makes it difficult to demultiplex a time sequential signal from a signal light which is multiplexed with time sequential signals of a transmission capacity of more than several ten Gb/s, due to the limitation in operation speed.

For this reason, it is required to process signals in a light region, as explained in the below literatures.

On pages 962 to 964 of "Electronics Letters, Vol. 27 No. 11, May, 1991", a four-wave mixing switch in which a signal light and a clock light are supplied to an optical fiber, and four-wave mixing occurs in the optical fiber dependent on the overlapping degree of pulses between the signal and clock lights is described.

On pages 962 to 964 of "Electronics Letters, Vol. 26 No. 14, July, 1990", a non-linear optical fiber loop mirror in which signal lights are propagated through an optical fiber in both directions, and a clock light is propagated through the optical fiber in one of the both directions, so that the signal light propagating in the same direction as the clock light is subject to cross phase modulation, and the signal light thus modulated and the signal light propagating in the opposite direction are interfered to provide switching operation is described.

On pages 1186 to 1198 of "IEEE Journal of Selected Areas in Communications, Vol. 6, No. 7", an optical Kerr switch is described. In the optical Kerr switch, linearly polarized signal and clock lights having an angle of 45° therebetween are supplied to an optical fiber, and the polarization of the signal light is rotated to provide switching operation by 90° by using the different of cross phase modulations between a component of the signal light parallel to the polarization of the clock light and a component thereof orthogonal thereto.

On pages 340 to 341 of "Electronics Letters, Vol. 24 No. 6, March 1988", a Mach-Zehnder type optical switch is described. In this optical switch, one of two divided signal light is supplied to a non-linear optical medium along with a clock light, an the signal light is shifted in phase in the non-linear optical medium by cross phase modulation, so that the cross phase modulated signal light and the remaining one of the two divided signal light are interfered to provide switching operation.

However, the clock extraction apparatus using the self-timing method or the phase locked oscillator has a disadvantage in that a operation frequency is several tens GHz at most, and it is difficult to extract a clock from a ultra-high speed signal light of, for instance, 100 Gb/s.

The optical PLL circuit using the semiconductor optical amplifier has a disadvantage in that an operation frequency is limited to be several tens GHz at most by the semiconductor optical amplifier. Further, one more clock light generator is required to generate a clock light of a frequency f locked in phase to the signal light, because the repetition frequency of the obtained clock light is (f+$\Delta$f) for the reason that the frequency $\Delta$f is superposed on the output signal of the VCO.

The optical time-division demultiplexing apparatus has a disadvantage in that the phase lock between the signal and clock lights is required to necessitate the conventional optical clock extracting apparatus. This results in large size, high cost and large power consumption.

SUMMARY OF THE INVENTION

Accordingly, it is an object of the invention to provide an apparatus for extracting an optical clock and apparatus for demultiplexing a time-division multiplexed signal in operation is carried out with ultra-high speed.

It is a further object of the invention to provide an apparatus for extracting an optical clock and an apparatus for demultiplexing a time-division multiplexed signal in which one more clock light generator is not required to be used.

It is a still further object of the invention to provide an apparatus for extracting an optical clock and an apparatus for demultiplexing a time-division multiplexed signal of which size is small, cost is low, and power consumption is reduced.

According to the first feature of the invention, an apparatus for extracting an optical clock, comprises:

a voltage controlled oscillator (VC0) for generating a clock signal of a frequency dependent on an applied voltage; a clock light generator for generating a clock light of an intensity modulated light which is synchronous with the clock signal;

an optical coupler for combining a pulse coded signal light and the clock light;

a non-linear optical medium for generating third order non-linear optical effect by receiving the signal and clock lights combined in the optical coupler;

an optical extractor for extracting at least one light from outputs lights of the non-linear optical medium; and a control circuit for applying a control voltage dependent on the one light to the VCO, wherein the control circuit supplies the VCO with the control voltage which is dependent on a time-mean value in power of the one light, whereby the VCO generates the clock signal, and the clock light generator generates the clock light, the clock signal and the clock light being locked in phase to the signal light and having a clock frequency of one Nth or N times of a clock frequency of the signal light, where N is an integer, and the output lights being the signal light, the clock light, and a four-wave mixing light generated by the signal and clock lights.

According to the second feature of the invention, an apparatus for demultiplexing a time-division multiplexed signal, comprises:

a voltage controlled oscillator (VCO) for generating a clock signal of a frequency dependent on an applied voltage;

a clock light generator for generating a clock light of an intensity modulated light which is synchronous with the clock signal;

an optical coupler for combining a pulse coded signal light and the clock light, the signal light comprising N-time division sequential lights;

a non-linear optical medium for generating third order non-linear optical effect by receiving the signal and clock lights combined in the optical coupler;

an optical extractor for extracting at least one light from outputs lights of the no-linear optical medium;

a control circuit for applying a control voltage dependent on the one light to the VCO; and an optical divider for dividing the one light into first and second lights, the first light being a demultiplexed light having a clock frequency of one Nth of a clock frequency of the signal light, and the second light being supplied to the control circuit, wherein the control circuit supplies the VCO with the control voltage which is dependent on a time-mean value in power of the second light, whereby the VCO generates the clock light generator generates the clock light, the clock signal and the clock light being locked in phase to the signal light, and the output lights being the signal light, the clock light, and a four-wave mixing light generated by the signal and clock lights.

BRIEF DESCRIPTION OF THE DRAWINGS

The invention will be explained in more detail in conjunction with appended drawings, wherein:

FIGS. 2A to 2C are spectrum diagrams of a signal light, a clock light and a four-wave mixing light in FIG. 1, FIGS. 3A to 3D are explanatory diagrams for the relation between power and phase difference between the signal and clock lights in FIG. 1, FIGS. 4A and 5 are block diagrams showing apparatus for extracting an optical clock in the second and third preferred embodiments according to the invention.

DESCRIPTION OF THE PREFERRED EMBODIMENTS

Figure 1:
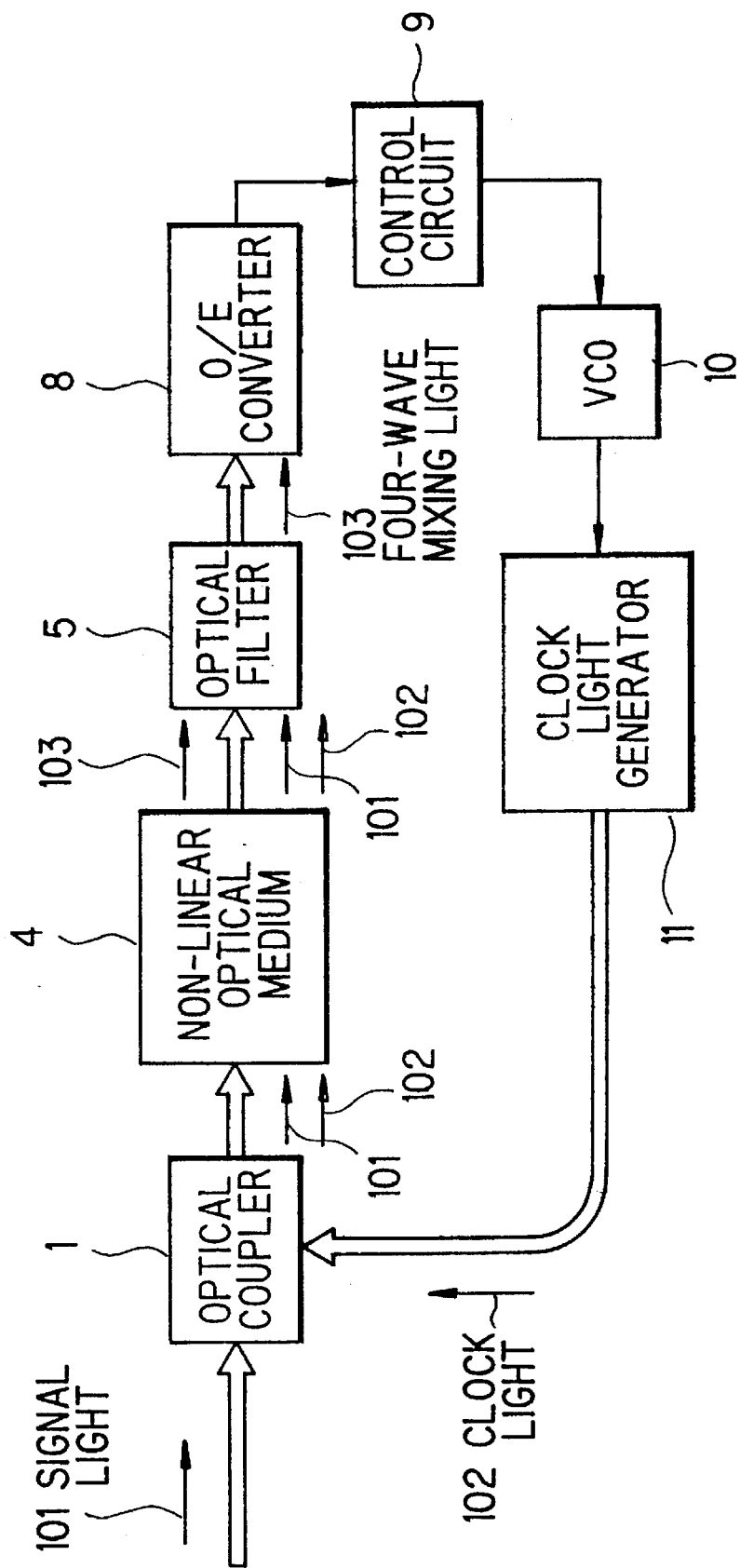
FIG. 1 is a block-diagram showing an apparatus for extracting an optical clock in the first preferred embodiment according to the invention.

FIG. 1 shows an apparatus for extracting a clock light in the first preferred embodiment according to the invention. The apparatus comprises an optical coupler 1, an optical non-linear medium 4, an optical filter 5, an optoelectric (O/E) converter 8, a control circuit 9, a voltage controlled oscillator (VCO) 10, and a clock light generator 11.

In the timing extracting apparatus, a signal light 101 which is supplied to the optical coupler 1 is a pulse-coded signal into which an output light of a semiconductor laser lasing with a single mode is modulated to have a data rate of 20 Gb/s, a mark ratio of ½, and a pulse width of 25 ps in the form of RZ code by a $LiNbO_3$ optical modulator, and a clock light 102 which is also supplied to the optical coupler 1 has a repetition frequency of 20 GHz, and a pulse width of 25 ps which are the same as those in the signal light 1. The clock light 102 is generated in the clock light generator 11 utilizing a gain switch as a pulse light source to be driven by an electric signal of an oscillation frequency of 20 GHz supplied from the VCO 10.

The signal light 101 having a wavelength $\lambda s$ of 1.554 μm and the clock light 102 having a wavelength $\lambda c$ of 1.550 μm are combined by the optical coupler 1, from which an output light is incident to the non-linear optical medium 4 which is a silica-based single mode optical fiber having a length of 10 km and a zero-dispersion wavelength of 1.552 μm. The peak powers of the signal and clock lights 101 and 102 are set to be +40 mW at the input of the non-linear optical medium 4, in which four-wave mixing occurs to provide to four-wave mixing lights 103 having wavelength $\lambda m_1$ and $\lambda m_2$ of 1.546 μm ($2\lambda c-\lambda s$) and 1.558 μm ($2\lambda s-\lambda c$) as output lights thereof along with the signal and clock lights 101 and 102. Among the output lights of the non-linear optical medium 4, only the four-wave mixing light 103 of the wavelength $\lambda m_1$ passes through the optical filter 5. Thus, the four-wave mixing light 103 is extracted. The extracted four-wave mixing light 103 is received to be supplied as an electric signal to the control circuit 9 by the O/E converter 8, from which a control signal is supplied to the VCO 10. Thus, an optical phase locked loop (optical PLL) is structured.

Operation will be explained in more detail in FIGS. 2A to 2C, and FIGS. 3A to 3D. FIG. 2A shows the signal and clock lights 101 and 102 ($\lambda c$ and $\lambda s$) supplied from the optical coupler 1, FIG. 2B shows the signal and clock lights 101 and 102 ($\lambda c$ and $\lambda s$) and the four-wave mixing lights 103 ($\lambda m_1$ and $\lambda m_2$) supplied from the non-linear optical medium 4, and FIG. 2C shows the four-wave mixing light 103 ($\lambda m_1$) extracted by the optical filter 5.

The power of the four-wave mixing light 103 is dependent on a phase difference $\Phi$ between the signal and clock lights 101 and 102 as shown in FIGS. 3A to 3D. FIG. 3A shows the case where the phase difference $\Phi$ is zero between the signal and clock lights 101 and 102, so that the power of the four-wave mixing light 103 is maximum, FIG. 3B shows the case where the phase difference $\Phi$ is $\pi/2$ therebetween, so that the power of the four-wave mixing light 103 is lowered as compared to the maximum value, and FIG. 3C shows the case where the phase difference $\Phi$ is $\pi$, so that the power of the four-wave mixing light 103 is minimum.

In accordance with the four-wave mixing light 103 as shown in FIGS. 3A to 3C, the time-mean value of power for the four-wave mixing light 103 relative to the phase difference $\Phi$ is obtained as shown in FIG. 3D.

As understood from the above explanation, the phase lock between the signal and clock lights 101 and 102 is obtained by converting the four-wave mixing light 103 to an electric signal in the O/E converter 8 and feeding the electric signal via the control circuit 9 to the VCO 10.

In practical use of the timing extracting apparatus in the first preferred embodiment, operation is confirmed that the phase differences of the clock light 102 and an electric clock signal for generating the clock light 102 relative to the signal light 101 are maintained to be constant even in the case where the frequency of a clock signal in a signal source for driving the LiNbO₃ optical modulator is fluctuated to some extent.

Figure 4A:
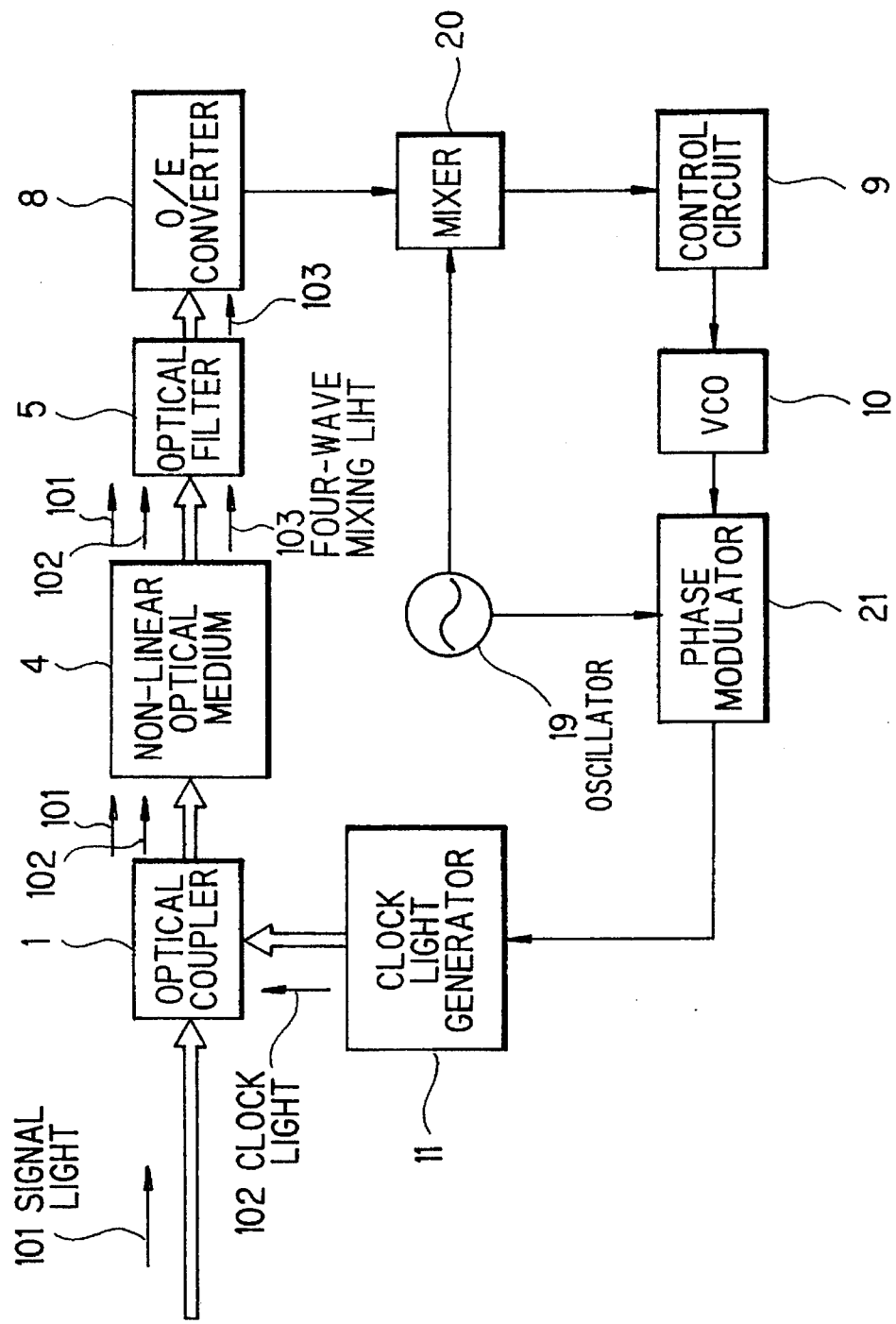
FIG. 4B is a graph showing a bit error rate performance in the apparatus as shown in FIG. 4A.

FIG. 4A shows an apparatus for extracting a clock light in the second preferred embodiment according to the invention, wherein like parts are indicated by like reference numerals as used in FIG. 1, and the apparatus further comprises an oscillator 19, a mixer 20, and a phase modulator 21.

In the timing extracting apparatus, a signal light 101 which is supplied to the optical coupler 1 is a pulse coded signal into which an output light of a semiconductor laser lasing with a signal mode is modulated to have a data rate of 20 Gb/s, a mark ratio of ½, and a pulse width of 20 ps in the form of RZ code by a LiNbO₃ optical modulator, and a clock light which is also supplied to the optical coupler 1 is an intensity-modulated signal into which an output light of a semiconductor laser lasing with a single mode is modulated to have a repetition frequency of 20 GHz which is the same as the clock frequency of 20 GHz for the signal light 101 by a LiNbO₃ optical modulator. The clock generator 11 is driven by an electric output signal of an oscillator frequency of 20 GHz supplied from the VCO 10, wherein the output signal of the VCO 10 is phase modulated by the phase modulator 21 which is driven by an oscillation frequency of 100 kHz supplied from the oscillator 19.

The signal light 101 having a wavelength $\lambda s$ of 1.554 μm and the clock light 102 having a wavelength $\lambda c$ of 1.550 μm are combined in the optical coupler 1. The combined signal and clock lights 101 and 102 each having a peak power of +40 mW are supplied to an input of the non-linear optical medium 4 of a silica-based single mode optical fiber having a length of 10 km and a zero-dispersion wavelength of 1.552 μm, from which four-wave mixing light 103 having a wavelength $\lambda m_1$ ($=2\lambda c-\lambda s$) of 1.546 $\lambda m$ and a wavelength $\lambda m_2$ ($=2\lambda s-\lambda c$) of 1.558 μm are obtained along with the signal and clock lights 101 and 102. Among the output lights of the non-linear optical medium 4, one of the four-wave mixing lights 103 passes through the optical filter 5. Thus, the four-wave mixing light 103 is extracted. The extracted four-wave mixing light 103 is converted to an electric signal in the O/E convertor 8, and the electric signal is supplied to the mixer 20 together with an output signal of the oscillator 19. In the mixer 20, a voltage is generated dependency on a phase difference between the signal and clock lights in accordance with synchronous detection. The generator voltage is supplied from the mixer 20 to the control circuit 9, form which a control signal is supplied to the VCO 10. Thus, an optical phase locked loop (optical PLL) is structured.

As explained in FIGS. 3A to 3D, the time-mean value of power for the four-wave mixing light 103 is maximum in case of the phase difference of zero between the signal and clock lights 101 and 102, and minimum in case of the phase difference of $\pi$ therebetween.

In the phase modulator 21, a signal of 100 kHz is superposed to the output signal of the VCO 10, so that the phase modulation of a repetition frequency 100 kHz is applied to the clock light 102. The phase-modulation component is represented on the four-wave mixing light 103, so that the phase difference $\Phi$ is detected between the signal and clock lights 101 and 102 by the synchronous detection in the mixer (phase comparator) 20 supplied with output signals of the O/E converter 8 and the oscillator 19. The output signal of the mixer 20 is supplied via the control circuit 9 to the VCO 10, so that the phase lock between the signal and clock lights 101 and 102 is realized.

In practical use of the timing extracting apparatus in the second preferred embodiment, it is confirmed that the clock light 102 and a related electric clock signal are locked in phase to the signal light 101, even if a clock frequency of a signal source for driving the LiNbO₃ optical modulator is fluctuated to some extent.

Figure 4B:
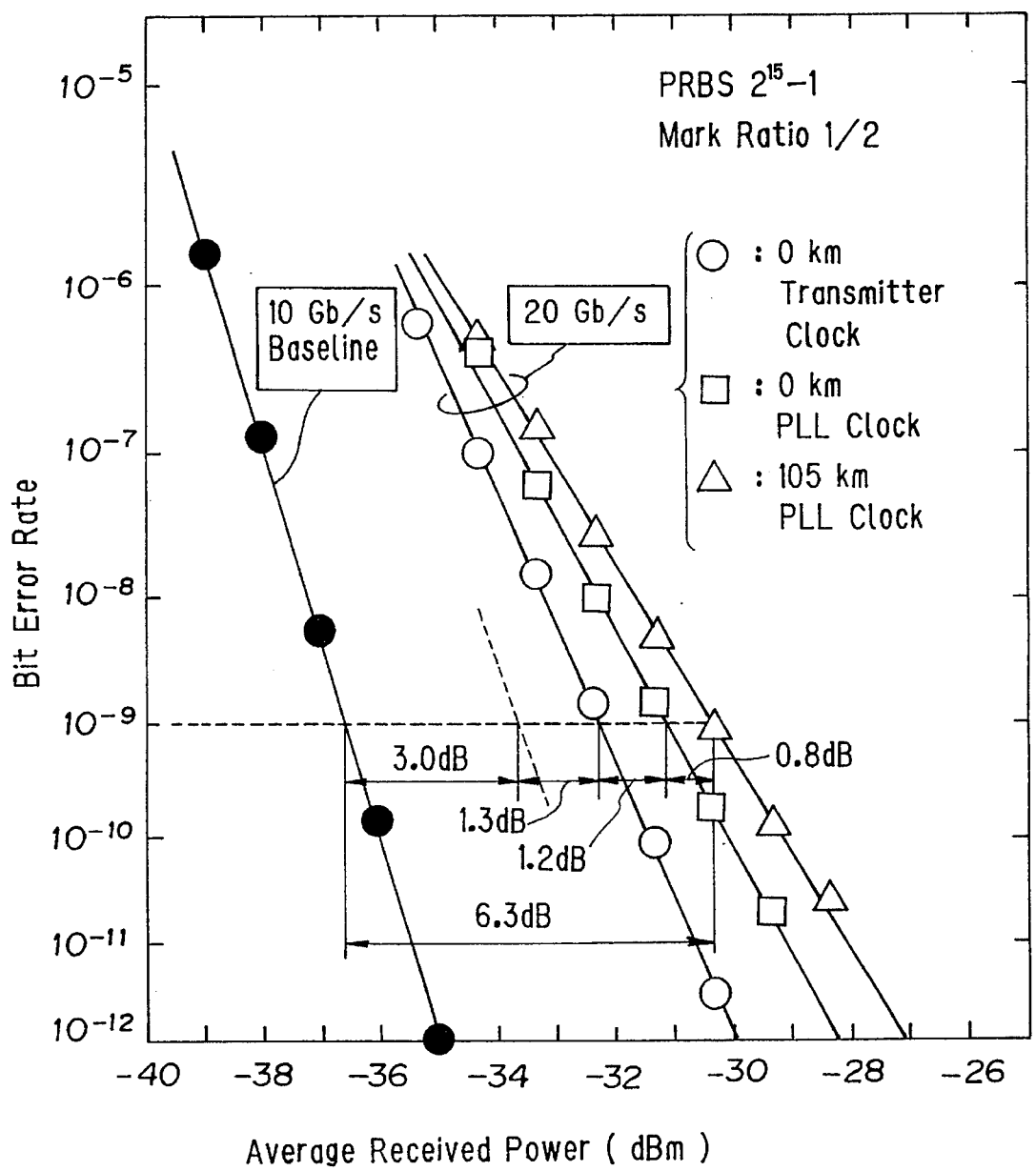
Figure 5:
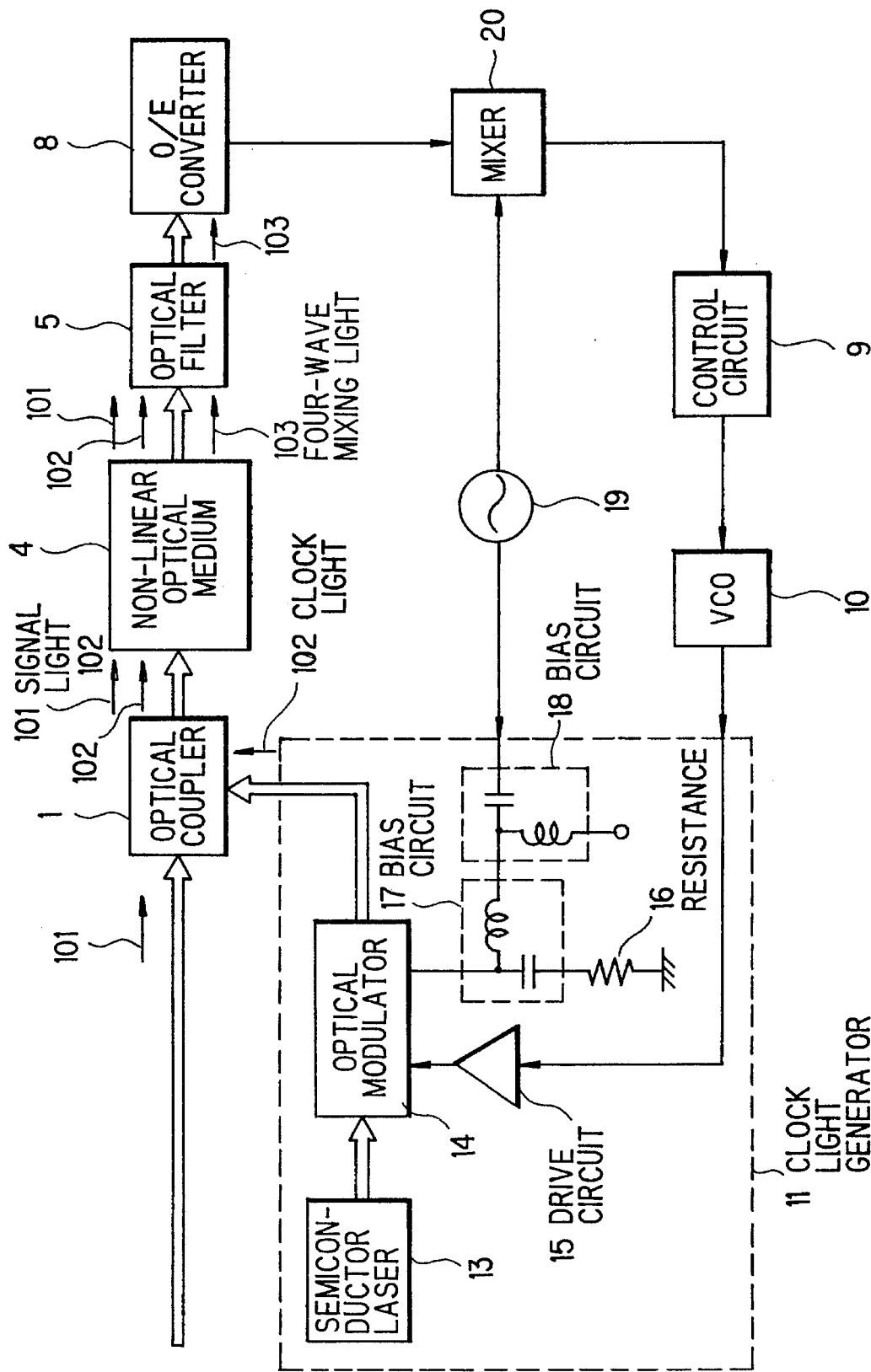

FIG. 5 shows an apparatus for extracting a clock light in the third preferred embodiment according to the invention, wherein like parts are indicated by like reference numerals as used in FIG. 4, and the clock light generator 11 comprises a semiconductor laser 13, a LiNbO₃ optical modulator 14, a drive circuit 15, a resistance 16, and bias circuit 17 and 18.

In the timing extracting apparatus, the signal light 101 is the same as one used in the first and second preferred embodiments, and the clock light 102 is generated in the clock light generator 11 which an output light of the semiconductor laser 13 lasing with a signal mode is intensity-modulated in the LiNbO$_3$ optical modulator 14 which is driven by the drive circuit 15, and a frequency of the clock light 102 is the same as that of the signal light 101.

In setting an operation point of the LiNbO$_3$ optical modulator 14, the two bias circuits 17 and 18 are used to superpose an intensity modulation signal of 100 kHz on the clock light 102. The first bias circuit 17 biases the clock light 102 of 20 GHz, and the second bias circuit 18 biases an output signal of 100 kHz supplied from the oscillator 19. As shown in FIG. 5, the first bias circuit 17 is connected via the resistance 16 of 50 Ω to ground.

The signal light 101 having a wavelength λs of 1.554 μm and the clock light 102 having a wavelength λc of 1.550 μm are combined in the optical coupler 1, from which the combined signal and clock lights 101 and 102 are supplied to the non-linear optical medium 4 of a silica-based single mode optical fiber having a length of 10 km and a zero-dispersion wavelength of 1.552 μm, wherein the input peak power levels of the signal and clock lights 101 and 102 are set to be +40 mW. In the non-linear optical medium 4, four-wave mixing occurs in accordance with the signal and clock lights 101 and 102, so that four-wave mixing lights 103 having a wavelength λm$_1$ (=2λc–μs) of 1.546 μm are obtained at the output of the non-linear optical medium 4.

Among the signal and clock lights 101 and 102, and the four-wave mixing lights 103, the four-wave mixing light 103 having the wavelength λm$_1$ passes through the optical filter 5 to be converted to an electric signal in the O/E converter 8. The output signals of the O/E converter 8 and the oscillator 19 are supplied to the mixer 20, in which a voltage is generated dependency on a phase difference between the signal and clock lights 101 and 102. The output signal of the mixer 20 is supplied to the control circuit 9, from which a control signal is fed back to the VCO 10. Thus, an optical PLL is structured.

In operation, the relations between power and wavelength and between power and phase difference as explained in FIGS. 2A to 2C and 3A to 3D are applied to the third preferred embodiment.

In the third preferred embodiment, the signal of 100 kHz which is the output signal of the oscillator 19 is superposed on the LiNbO$_3$ optical modulator 14, so that the intensity-modulation of 100 kHz is superposed on the clock light 102. This intensity-modulation component is represented on the four-wave mixing light 103. Therefore, the output signal of the O/E converter 8 and the oscillator 19 are supplied to the mixer 20 to carry out the synchronous detection, so that a phase difference Φ is detected between the signal and clock lights 101 and 102.

The output signal of the mixer 20 is supplied via the control circuit 9 to the VCO 10, thereby to lock the signal and clock lights 101 and 102 in phase.

In practical use of the timing extracting apparatus in the third preferred embodiment, it is confirmed that an electric clock and the clock light 102 are maintained to be locked in phase to the signal light 101, even if a clock frequency of a signal source for driving the LiNbO$_3$ optical modulator is fluctuated to some extent.

Figure 6:
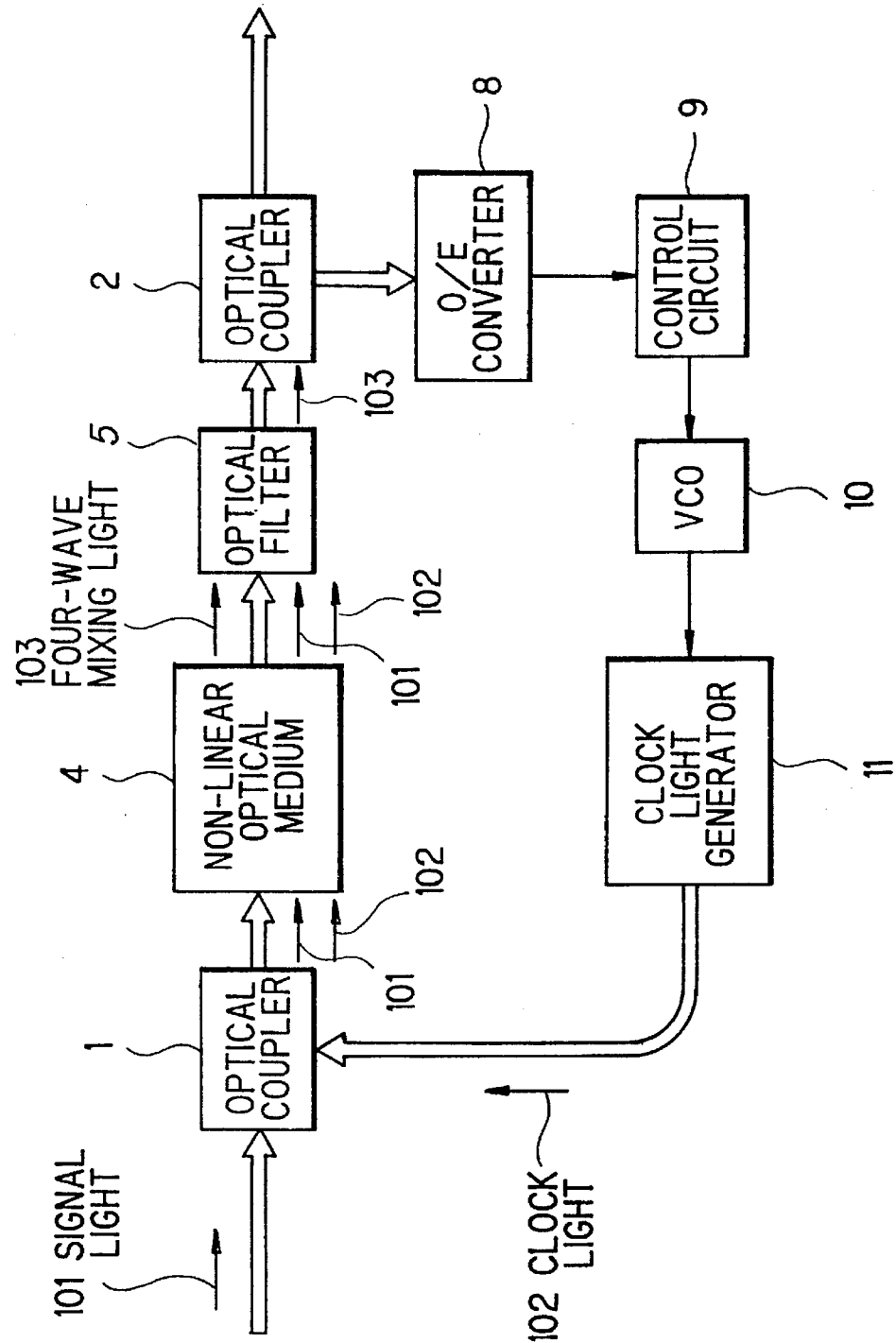
FIG. 6 is a block diagram showing an apparatus for demultiplexing a time-division multiplexed signal in the first preferred embodiment according to the invention.

FIG. 6 shows an apparatus for demultiplexing an optical time-division multiplexed signal in the first preferred embodiment according to the invention. The apparatus comprises optical couplers 1 and 2, a non-linear optical medium 4, an optical filter 5, an O/E converter 8, a control circuit 9, a VCO 10, and a clock light generator 11.

In the demultiplexing apparatus, a signal light 101 is a signal having a data rate of 40 Gb/s which is obtained by multiplexing in time-division four sequential signals. Each of the four sequential signals is obtained by dividing into four signals a short pulse having a repetition frequency of 10 GHz and a pulse width of 10 ps generated by a gain switch of a semiconductor laser, and by modulating each of the four-divided signals to have a data rate of 10 GHz, a mark ratio of ½ and a pulse width of 10 ps in the form of RZ code by a LiNbO$_3$ optical modulator. In the time-division multiplexing for the signal light 101, an appropriate time difference is assigned between adjacent sequential signals by an optical variable delay device which is an optical fiber stretcher, and the sequential signals thus processed are combined not to overlap on each other by an optical coupler. The clock light 102 has a repetition frequency of 10 GHz which is one quarter of the clock frequency of the signal light 101 and equal to the clock frequency of the sequential signals to be combined, and a pulse width of 10 ps equal to that of the signal light 101.

The clock light 102 as explained above is generated in the clock light generator 11 which is driven by an electric signal of an oscillation frequency of 10 GHz supplied from the VCO 10 and comprises a gain switch of a semiconductor laser for a pulse light source.

The signal light 101 having a wavelength λs of 1.554 μm and the clock light 102 having a wavelength λc of 1.550 μm are combined in the first optical coupler 1, from which the combined signal and clock lights 101 and 102 are supplied to the non-linear optical medium 4 of a silica-based single mode optical fiber having a length 10 km and a zero-dispersion wavelength of 1.552 μm. At the input of the non-linear optical medium 4, the peak power levels of the signal and clock lights 101 and 102 are set to be +40 mW, and four-wave mixing lights 103 having a wavelength λm$_1$ (=2λc–λs) of 1.546 μm are generated in the non-linear optical medium 4, as explained before. The four-wave mixing light 103 having the wavelength λm$_1$ is only passed through the optical filter 5, and is divided into two four-wave mixing lights by the second optical coupler 2. One of the two divided light is an output light, while the other divided light is supplied to the O/E converter 8, from which an electric signal is supplied to the control circuit 9.

Then, a control signal is supplied to the VCO 10. Thus, an optical PLL is structured.

The relations between power and wavelength and between power and phase difference as explained in FIGS. 2A to 2C and 3A to 3D are applied to this preferred embodiment.

Figure 7:
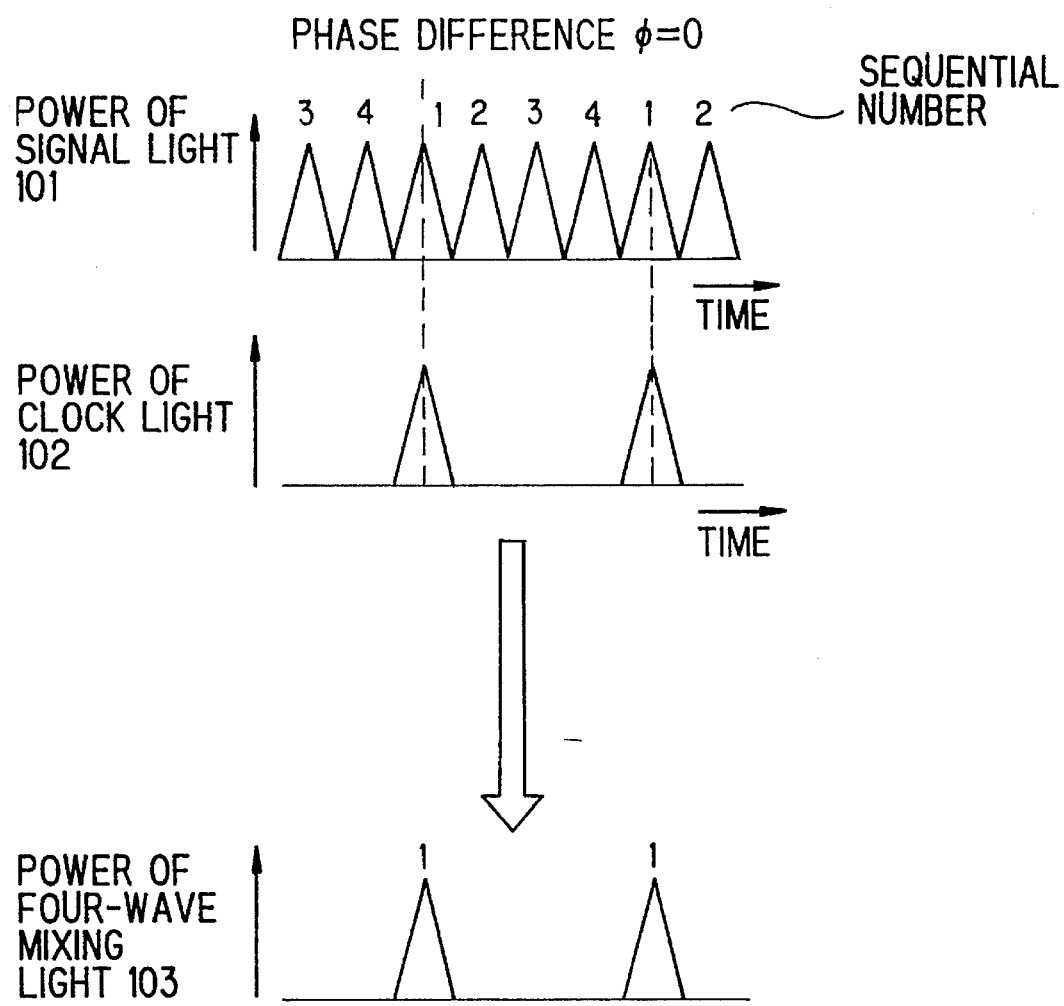
FIG. 7 is an explanatory diagram explaining operation in FIG. 6.

FIG. 7 shows the signal light 101 which comprises first to fourth sequential lights as numbered by 1 to 4, and the clock light 102 which is coincident with the first sequential signal 1 in case of no phase difference therebetween. Consequently, the four-wave mixing light 103 is generated at a timing common to those of the first sequential signal for the signal light 101 and the clock light 102.

In practical use of the demultiplexing apparatus in the first preferred embodiment, it is confirmed that the phase lock of the clock light 102 to the signal light 102 to the signal light 101 is realized, and one sequential signal of 10 GHz is demultiplexed from the signal light 101 of 40 GHz which is multiplexed by the first to fourth sequential signals.

Figure 8:
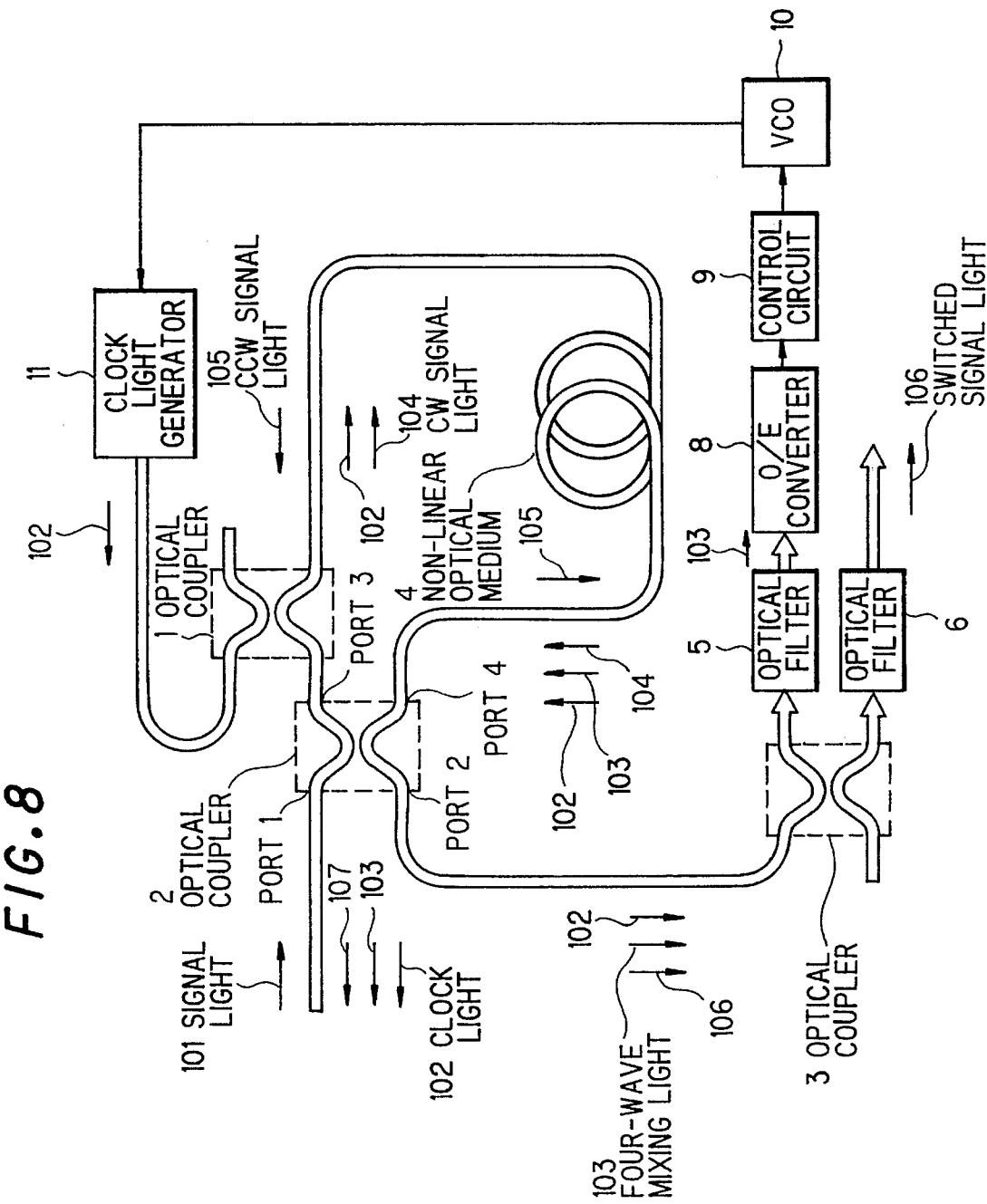
FIG. 8 is a block diagram showing an apparatus for demultiplexing a time-division multiplexed signal in the second embodiment according to the invention.

FIG. 8 shows an apparatus for demultiplexing a time-division multiplexed signal in the second preferred embodiment according to the invention.

The demultiplexing apparatus comprises optical couplers 1, 2 and 3, a non-linear optical medium 4, optical filters 5 and 6, an O/E converter 8, a control circuit 9, a VCO 10 and a clock light generator 11.

A signal light 1 which is the same as one in the first preferred embodiment is supplied to a port 1 of the optical fiber type first optical coupler 1 to be divided into two signal lights at ports 3 and 4 thereof. The signal light 104 of the clockwise (CW) direction supplied from the port 3 of the first optical coupler 1 and a clock light 102 which is the same as one in the first preferred embodiment are combined in the second optical coupler 2, from which output lights are supplied to the non-linear optical medium 4 of a silica-based single mode optical fiber having a length of 10 km and a zero-dispersion wavelength of 1.552 μm, at the input of which peak power levels of the signal and clock lights 104 and 102 are set to be +40 mW.

In the non-linear optical medium 4, four-wave mixing occurs in accordance with the CW signal light 104 and the clock light 102. From the output of the non-linear optical medium 4, four-wave mixing lights 103 having wavelength $\lambda m_1$ (=2$\lambda c$−$\lambda s$) and $\lambda m_2$ (=2$\lambda s$−$\lambda c$) of 1.546 λm and 1.558 μm are supplied along with the clock light 102 and the CW signal light 104 which is phase-shifted in accordance with a peak intensity of the clock light 102. The CW clock light 102, the CW four-wave mixing light 103, and the CW signal light 104 are supplied to the port 4 of the optical coupler 1, while the signal light 105 of counter clockwise (CCW) direction supplied from the port 4 of the optical coupler 1 propagates through the non-linear optical medium 4 to arrive at the port 3 of the optical coupler 1.

The CW and CCW signal lights 104 and 105 supplied to the ports 4 and 3 of the optical coupler 1 are interfered with each other, and the interfered light is obtained at the port 1 of the optical coupler 1 in case of zero in phase difference between the CW and CCW signal lights 104 and 105, and at the port 2 thereof in case of π in phase difference therebetween. The interfered light obtained at the port 1 is a non-switched signal light 107 which is subject to no phase shift for the CW signal light 104 induced by the clock light 102, and the interfered light obtained at the port 2 is a switched light 106 which is subject to a phase shift of π for the CW signal light 104 induced by the clock light 102. On the other hand, the clock light 102 and the four-wave mixing light 103 are respectively divided into two lights by the optical coupler 1. Consequently, the lights supplied from the port 1 of the optical coupler 1 are the non-switched signal light 107, the clock light 102, and the four-wave mixing light 103, from which only the non-switched signal light 107 is extracted to be supplied to a next stage for demultiplexing a time-division multiplexed signal by an optical filter.

The light supplied from the port 2 of the optical coupler 1 are the switched light 106, the clock light 102, and the four-wave mixing light 103 which are respectively divided into two lights, from one of which only the four-wave mixing light 103 is extracted by the first optical filter 5, and from the other one of which only the switched signal light 106 is extracted by the second optical filter 6. The output light of the first optical filter 5 is received in the O/E converter 8 to provide on electric signal which is supplied to the control circuit 9, from which a control signal is supplied to the VCO 10. Thus, an optical PLL is structured.

Figure 9:
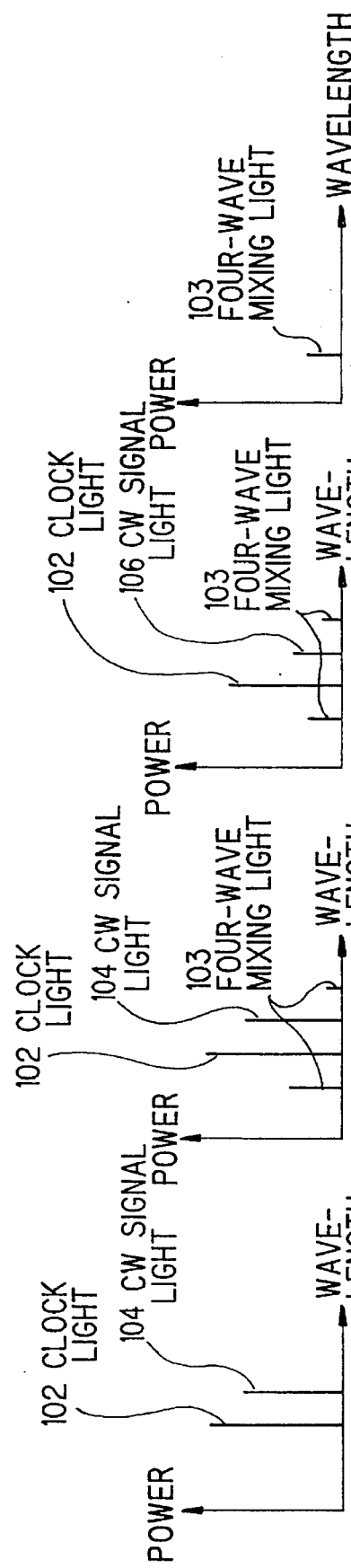
FIGS. 9A to 9D are spectrum diagrams for a signal light, a clock light, and a four-wave mixing light in FIG. 8.

Operation will be explained in FIGS. 9A to 9D. In FIG. 9A, the CW signal light 104 of the wavelength λs and the clock light 102 of the wavelength λc supplied from the second optical coupler 2 are shown, and, in FIG. 9B, the CW signal and clock lights 104 and 102, and the four-wave mixing lights 103 of the wavelengths $\lambda m_1$ and $\lambda m_2$ are shown as output lights of the non-linear optical medium 4. Then, the clock light 102, the CW signal light 106, and the four-wave mixing light 103 are obtained from the port 2 of the first optical coupler 1, as shown in FIG. 9C, and the four-wave mixing light 103 of the wavelength $\lambda m_1$ is only obtained from the optical filter 5, as shown in FIG. 9D.

Figure 10:
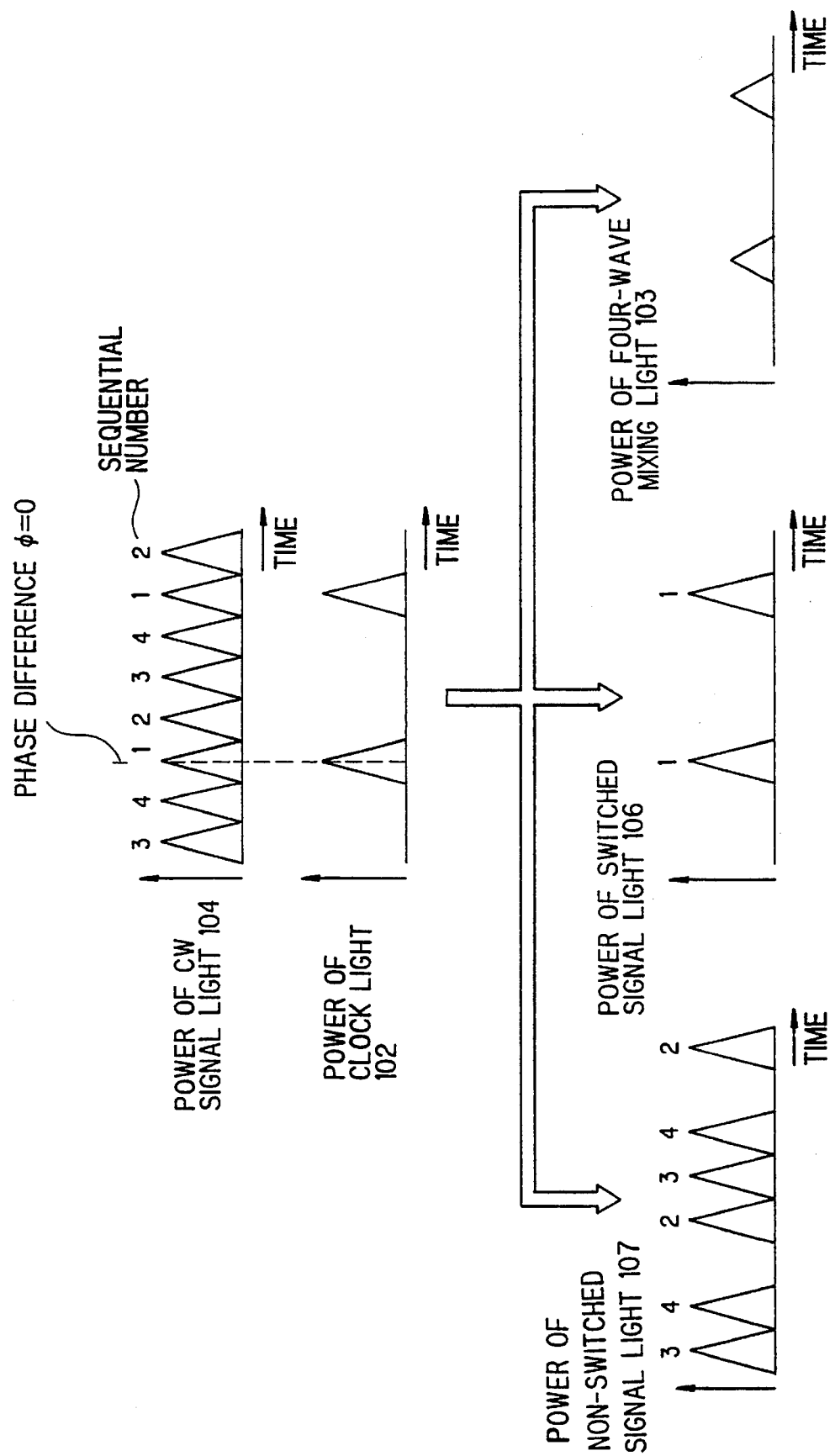
FIG. 10 is an explanatory diagram explaining operation in FIG. 8, and FIGS. 11 and 12 are block diagrams showing apparatus for demultiplexing a time-division multiplexed signal in the third and fourth preferred embodiment according to the invention.

As shown in FIG. 10, the CW signal light 104 comprises four time sequential signals as numbered by 1 to 4, and the clock light 102 has a repetition frequency of one quarter of the frequency of the CW signal light 104. In this case, the clock light 102 is in phase with the sequential signal 1 of the CW signal light 104 (corresponding to one of four time slots). Consequently, the switched signal light 106 (the sequential signals 19 is obtained at the port 2 of the optical coupler 1, and the non-switched signal light 107 (sequential signals 2 to 4) is obtained at the port 1 of the optical coupler 1, respectively, as shown thereof. FIG. 10 also shows the four-wave mixing light 103 supplied from the optical filter 5.

In this preferred embodiment, the clock light 102 may be in phase with any one of the sequential signal 2 to 4 in case of no phase difference between the signal light 101 and the clock light 102.

Figure 11:
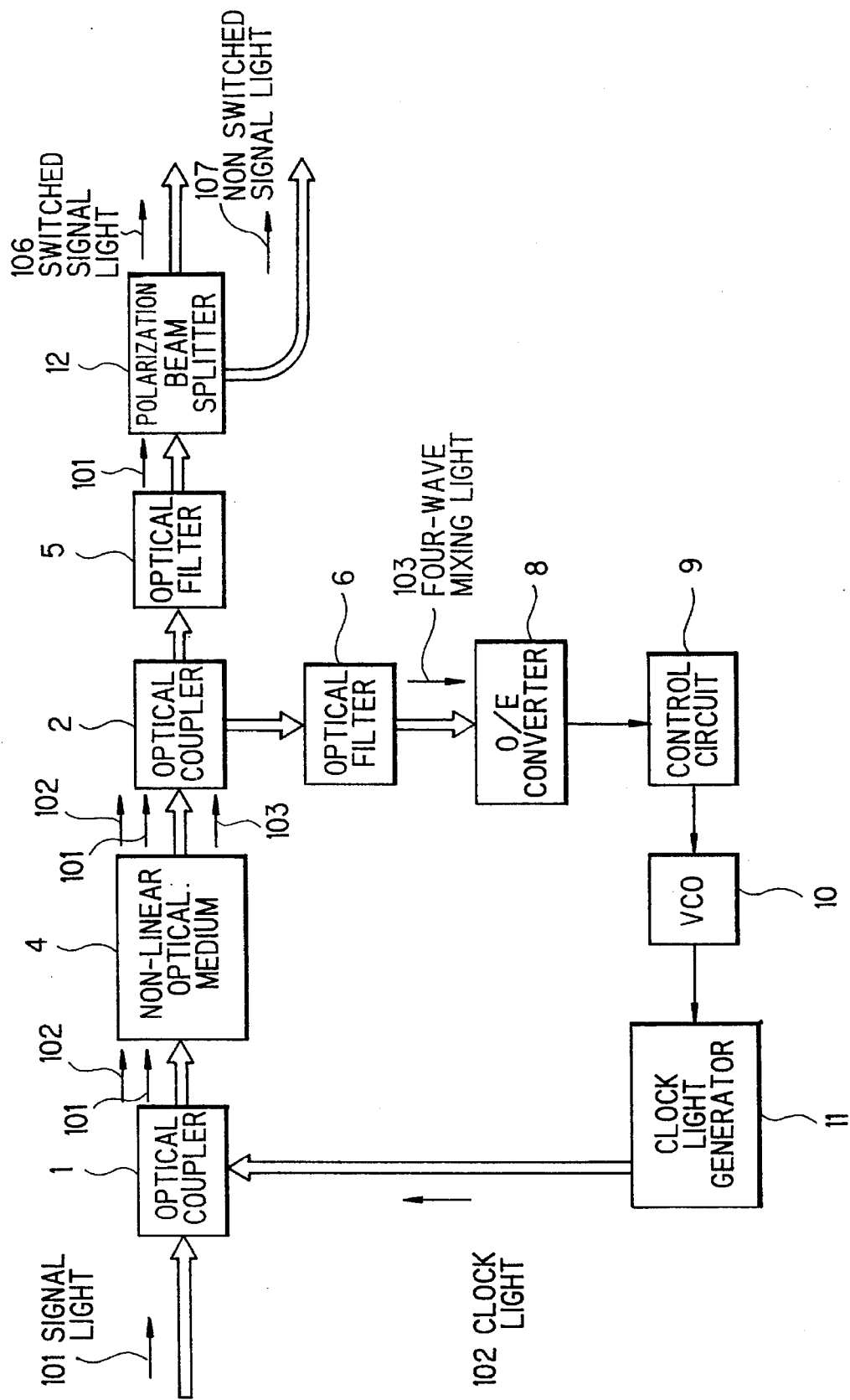

FIG. 11 shows an apparatus for demultiplexing a time-division multiplexed signal in the third preferred embodiment according to the invention. The demultiplexing apparatus comprises optical couplers 1 and 2, a non-linear optical medium 4, optical filters 5 and 6, an O/E converter 8, a control circuit 9, an VCO 10, a clock light generator 11, and a polarization beam splitter 12.

In the demultiplexing apparatus, a signal light 101 and a clock light 102 are combined in the first optical coupler 1 to be supplied to the non-linear optical medium 4 of a silica-based single mode optical fiber having a length of 10 km and a zero-dispersion wavelength of 1.552 μm under the same condition as in the first preferred embodiment.

At the input of the non-linear optical medium 4, a peak power of the signal light 101 is set to be +4 mW, and that of the clock light 102 is set to be +50 mW. The output lights of the non-linear optical medium 4 are respectively divided into two lights, from one of which only the signal light 101 is extracted by the first optical filter 5, and from the other one of which the four-wave mixing light 103 is extracted by the second optical filter 6. The signal light 101 is supplied from the first optical filter 5 to the polarization beam splitter 12, from which a switched signal light 106 and a non-switched signal light 107 are separately obtained. The four-wave mixing light 103 is supplied from the second optical coupler 6 to the O/E converter 8, from which an electric signal is supplied to a control circuit 9. Then, a control signal is supplied from the control circuit 9 to the VCO 10. Thus, an optical PLL is structured.

In the demultiplexing apparatus, the timing extracting operation is the same as one in the first preferred embodiment.

In the demultiplexing operation, the phenomenon in which phase shift amounts induced by cross phase modulation of a polarization component of the signal light 101 parallel to the clock light 102 and a polarization component of the signal light 101 thereto are different is used. When a phase difference of the two components is π, the signal light 101 is rotated in polarization between the input and the output of the non-linear optical medium 4 by 90°. For this reason, when the signal light 101 is supplied to the polarization beam splitter 12, the signal light 106 which is switched by the clock light 102 and the signal light 107 which is not switched by the clock light 102 are obtained from the polarizing beam splitter 12.

In practical use of the demultiplexing apparatus in the third preferred embodiment, it is confirmed that the clock light 102 is locked in phase to the signal light 101, and a time sequential signal of 10 Gb/s is obtained from the signal light 101 of 40 Gb/s which is multiplexed in time-division.

FIG. 12 shows an apparatus for demultiplexing a time-division multiplexed signal in the fourth preferred embodiment according to the invention. The demultiplexing apparatus comprises optical couplers 1, 2 and 3, a non-liner optical medium 4, optical filters 5, 6 and 7, an O/E converter 8, a control circuit 9, a VCO 10, and a clock light generator 11.

In the demultiplexing apparatus, the signal light 101 is set to be +4 mW in peak power level at the input of the non-linear optical medium, and the clock light 102 is set to be +40 mW in peak power level thereat.

In the demultiplexing apparatus, the timing extracting operation is similar to that in the first to third preferred embodiments, and the demultiplexing operation is carried out by utilizing a phase shift of the signal light 101 induced by cross phase modulation relative to the clock light 102. In the demultiplexing operation, when the phase shift amount is π, the signal lights 101 supplied from the second and third optical filters 6 and 7 are interfered in the third optical coupler 3 to provide a signal light 106 which is switched by the clock light 102 at one port of the third optical coupler 3 and to provide a signal light 107 which is not switched by the clock light 102 at the other port thereof.

In practical use of the demultiplexing apparatus in the fourth preferred embodiment, the same result as in the first to third preferred embodiments is obtained.

In the timing extracting apparatus and the demultiplexing apparatus as explained in the preferred embodiments, the structure may be modified as set out below.

The non-linear optical medium 4 is not limited to a silica-based single mode optical fiber, but it may be a semiconductor optical amplifier, an inorganic or organic having third order non-linear optical effect. Further, a polarization maintaining optical fiber or other optical fibers may be used for the non-linear optical medium. In such an optical fiber, the zero-dispersion wavelength may be 1.56 μm, 1.3 μm, or other wavelength under the condition where the non-linear optical effect is sufficiently obtained by the signal and clock lights 101 and 102.

The peak power levels of the signal and clock lights 101 and 102 may be +20 mW, +40 mW, or other values at the input of the non-linear optical medium 4, if the non-linear optical effect is generated. The optical power may be amplified by using an Er-doped optical fiber or a semiconductor optical amplifier as the non-linear optical medium 4, if the non-linear optical effect is sufficiently obtained. An optical amplifier may be used at an appropriate position for amplification purpose.

The wavelength of the signal or clock light 101 or 102 may be 1.3 μm, 1.555 μm, or other values.

The signal light 101 may be modified as set out below. That is, the data bit may 5 Gb/s or 100 Gb/s. The number of time-division multiplexing signals is not limited to 4, and may be 2 or 10. NRZ coding may be used in place of RZ coding. The mark ratio is not limited to ½, and may be ⅜ or ⅛. The pulse width is not limited to 25 ps or 10 ps, and may be 100 ps or 5 ps, if it is less than one time slot of a clock frequency of the signal light 101. The form of pulse may be a short pulse having a small duty ratio, a sine-wave pulse, or other forms, if it is functions as a signal light. The extinction ratio may be 10 dB, or 20 dB.

The clock light 102 may be modified as set out below. The division ratio of the clock frequency of the clock light 102 relative to the clock frequency of the signal light 101 is not limited to 4, and may be 2 or 20.

The clock frequency of the clock light 102 may be a value multiplexing the clock frequency of the signal light 101. The same things as in the signal light 101 are applied to the pulse width, the pulse form, the extinction ratio, etc. of the clock light 102.

An optical fiber squeezer may be used to control at least one of polarization of the signal and clock lights 101 and 102, so that the maximum non-linear optical effect is obtained dependent on polarizations.

A light received by the O/E converter 8 is not limited to the four-wave mixing light 103, but it may be the signal or clock light 101 or 102, a power time-mean value of the light 101 or 102 is reduced at the output of the non-linear optical medium 4 due to the generation of the four-wave mixing light 103. In this case, the minimum value may be controlled to maximize the overlapping degree of the signal and clock lights 101 and 102 by the control circuit 10 in the demultiplexing apparatus.

The optical couplers 1, 2 and 3 may be a reflection film type or other type in place of an optical fiber type.

The optical filters 5, 6 and 7 may be an interference film type, a Fabry Perot type, or other types.

The O/E converter 8 may be a p-i-n photodiode, an avalanche photodiode, or other types.

A pulse light source in the clock light generator 11 is not limited to a semiconductor laser using a gain switch, but it may be modified as set out below. That is, it may be a semiconductor laser using a mode lock as a short pulse generator, a ring laser, or other devices which are driven to provide appropriate repetition frequency and pulse width by an output signal of the VCO 10. When the repetition frequency and the pulse width are not obtained in the light source, a repetition frequency is generated by branching a light in an optical coupler, applying a delay to the branched light, and combining the delayed light to a light from the light source, and a pulse width is regulated by the pulse compression technology using grating pair, or using high order soliton. Further, the clock pulse 102 is not limited to a short pulse light, and it may be an intensity modulation light which is normally obtained by an external modulator such as the LiNbO$_3$ optical modulator 14 and an electric field absorption type semiconductor optical modulator, wherein the intensity modulation index is not limited, if the non-linear optical effect is obtained.

In the preferred embodiments as shown in FIGS. 4 and 5, the oscillation frequency of 100 kHz in the oscillator 19 may be changed to be, for instance, 1 MHz, or 10 kHz, if synchronous detection is realized.

The non-linear switch used in the demultiplexing apparatus is not limited to a non-linear optical fiber loop mirror, an optical Kerr switch, or other types using the signal and clock lights 101 and 102 having different wavelengths.

As described above, advantages of the timing extracting apparatus and the demultiplexing apparatus are summarized below.

(1) Ultra-high speed operation of THz order is possible to be carried out in selection of a non-linear medium, because the four-wave mixing which is non-linear optical effect is used. Consequently, clock is reproduced from an ultra-high speed signal light of several ten GHz, although this is impossible in electrical processing.

(2) A highly stable clock light is obtained, because the four-wave mixing is stably obtained.

(3) A clock light of a clock frequency which is one Nth (1/N) or N times of a clock frequency of a signal light is obtained to operate as, for instance, an optical frequency divider, and an optical frequency multiplier.

(4) Both of an optical clock and an electric clock are obtained, because an output signal of the VCO is locked in phase to a signal light.

(5) In an apparatus for demultiplexing a time-division multiplexed signal, a non-linear optical medium is commonly used by an apparatus for extracting an optical clock. Consequently, small size, stabilization, low power consumption, and low cost are simultaneously obtained.

Although the invention has been described with respect to specific embodiment for complete and clear disclosure, the appended claims are not to be thus limited but are to be construed as embodying all modification and alternative constructions that may be occur to one skilled in the art which fairly fall within the basic teaching here is set forth.

What is claimed is:

1. An apparatus for extracting an optical clock, comprising:

a voltage controlled oscillator (VCO) for generating a clock signal of a frequency dependent on an applied voltage;

a clock light generator coupled to said VCO for generating a clock light of an intensity modulated light which is synchronous with said clock signal;

an optical coupler for combining a pulse coded signal light and said clock light;

a non-linear optical medium for generating a third order non-linear optical effect by receiving said signal and clock lights combined in said optical coupler;

an optical extractor for extracting at least one light from outputs lights of said non-linear optical medium; and a control circuit for applying a control voltage dependent on said one light to said VCO, wherein said control circuit supplies said VCO with said control voltage which is dependent on a time-mean value in power of said one light, to cause said VCO to generate said clock signal and said clock light generator to generate said clock light, said clock signal and said clock light being locked in phase to said signal light and having a clock frequency of one Nth or N times of a clock frequency of said signal light, where N is an integer, and said output lights being said signal light, said clock light, and four-wave mixing lights generated by said signal and clock lights.

2. An apparatus for extracting an optical clock, according to claim 1, further comprising:

an oscillator for generating an oscillation signal;

a phase comparator for generating a phase difference between said signal and clock lights by receiving said one light and said oscillation signal said control voltage being dependent on said phase difference; and a phase modulator for modulating a phase of said clock signal in accordance with said oscillation signal.

3. An apparatus for extracting an optical clock, according to claim 1, wherein:

said clock light generator comprises a semiconductor laser for emitting a light; a LiNbO$_3$ optical modulator for modulating said light to generate said clock light; a drive circuit for driving said LiNbO$_3$ optical modulator by receiving said clock signal; and a bias circuit for biasing said LiNbO$_3$ optical modulator.

4. An apparatus for extracting an optical clock, according to claim 3, wherein:

said bias circuit includes first means for setting an operating point of the LiNbo$_3$ optical modulator and second bias means for modulating the operating point of the LiNbo$_3$ optical modulator.

5. An apparatus for demultiplexing a time-division multiplexed signal, comprising:

a voltage controlled oscillator (VCO) for generating a clock signal of a frequency dependent on an applied voltage;

a clock light generator coupled to said VCO for generating a clock light of an intensity modulated light which is synchronous with said clock signal;

an optical coupler for combining a pulse coded signal light and said clock light, said signal light comprising N-time division sequential lights;

a non-linear optical medium for generating a third order non-linear optical effect by receiving said signal and clock lights combined in said optical coupler;

an optical extractor for extracting at least one light from outputs lights of said non-linear optical medium;

a control circuit for applying a control voltage dependent on said one light to said VCO; and an optical divider for dividing said one light into first and second lights, and first light being a demultiplexed light having a clock frequency of one Nth of a clock frequency of said signal light, and said second light being supplied to said control circuit, wherein said control circuit supplies said VCO with said control voltage which is dependent on a time-mean value in power of said second light to cause said VCO to generate said clock signal and said light generator to generate said clock light, said clock signal and said clock light being locked in phase to said signal light, and said output lights being said signal light, said clock light, and four-wave mixing lights generated by said signal and clock lights.

6. An apparatus for demultiplexing a time-division multiplexed signal, comprising:

a voltage controlled oscillator (VCO) for generating a clock signal of a frequency dependent on an applied voltage;

a clock light generator coupled to said VCO for generating a clock light of an intensity modulated light which is synchronous with said clock signal;

an optical coupler for combining a pulse coded signal light comprising N time-division sequential lights and said clock light corresponding in timing to one of said N time-division sequential lights;

a non-linear optical medium for resulting in a phase shift or a frequency shift on said one of said N time-division sequential lights and generating four-wave mixing lights by receiving said signal and clock lights combined in said optical coupler;

an optical extractor for extracting one light from said signal and clock lights and said four-wave mixing lights;

a control circuit for applying a control voltage dependent on said one light to said VCO; and an optical demultiplexer for demultiplexing said signal light from said non-linear optical medium to separate a switched signal light of said one of N time-division sequential lights and a non-switched signal light of remaining lights of said N time-division sequential lights;

wherein said control circuit supplies said VCO with said control voltage which is dependent on a time-mean value in power of said one light to cause said VCO to generate said clock signal, and said clock light generator to generate said clock light, said clock signal and said clock light being locked in phase to said signal light.

7. An apparatus for demultiplexing a time-division multiplexed signal, according to claim 6, wherein:

said optical demultiplexer is an optical coupler.

8. In an apparatus for demultiplexing a time-division multiplexed signal, according to claim 6, wherein:

said optical demultiplexer is a polarizing beam splitter.

* * * * *